United States Patent [19]

Arai et al.

[11] Patent Number: 4,621,328

[45] Date of Patent: Nov. 4, 1986

[54] APPARATUS FOR CONTROLLING A SPEED CHANGE GEAR

[75] Inventors: Kenji Arai, Ogawa; Masaharu Inamo, Kawagoe, both of Japan

[73] Assignee: Diesel Kiki Co., Ltd., Japan

[21] Appl. No.: 485,011

[22] Filed: Apr. 14, 1983

[30] Foreign Application Priority Data

Apr. 17, 1982 [JP] Japan .................................. 57-63234

[51] Int. Cl.[4] ......................... F16H 5/28; B60K 41/18; G05D 13/34
[52] U.S. Cl. .................................. 364/424.1; 74/335; 74/365
[58] Field of Search ................. 364/424.1; 74/335, 365

[56] References Cited

U.S. PATENT DOCUMENTS 3,805,640  4/1974  Schneider et al. ..................... 74/365
4,150,416  4/1979  Heppenstall et al. ............ 74/335 X
4,175,448  11/1979  Loew et al. ....................... 74/335 X Primary Examiner—Felix D. Gruber
Attorney, Agent, or Firm—Guy W. Shoup

[57] ABSTRACT

In an apparatus for operating the change lever of the speed change gear on the basis of the data concerning the passage for a change lever, the apparatus comprises a memory for storing the data, and a computer for obtaining detection signals corresponding to the opposite side positions of the passage by moving the change lever between the opposite sides at any desired portion within the passage, for updating the data stored in the memory on the basis of the detection signals and for computing the optimum moving path for the change lever on the basis of the updated data stored in the memory. Thus, the optimum moving path of the change lever can be automatically determined by the learning function, so that maintenance, inspection and the like can be remarkably simplified. Furthermore, it is possible to move the change lever smoothly to the desired gear shift position.

8 Claims, 5 Drawing Figures

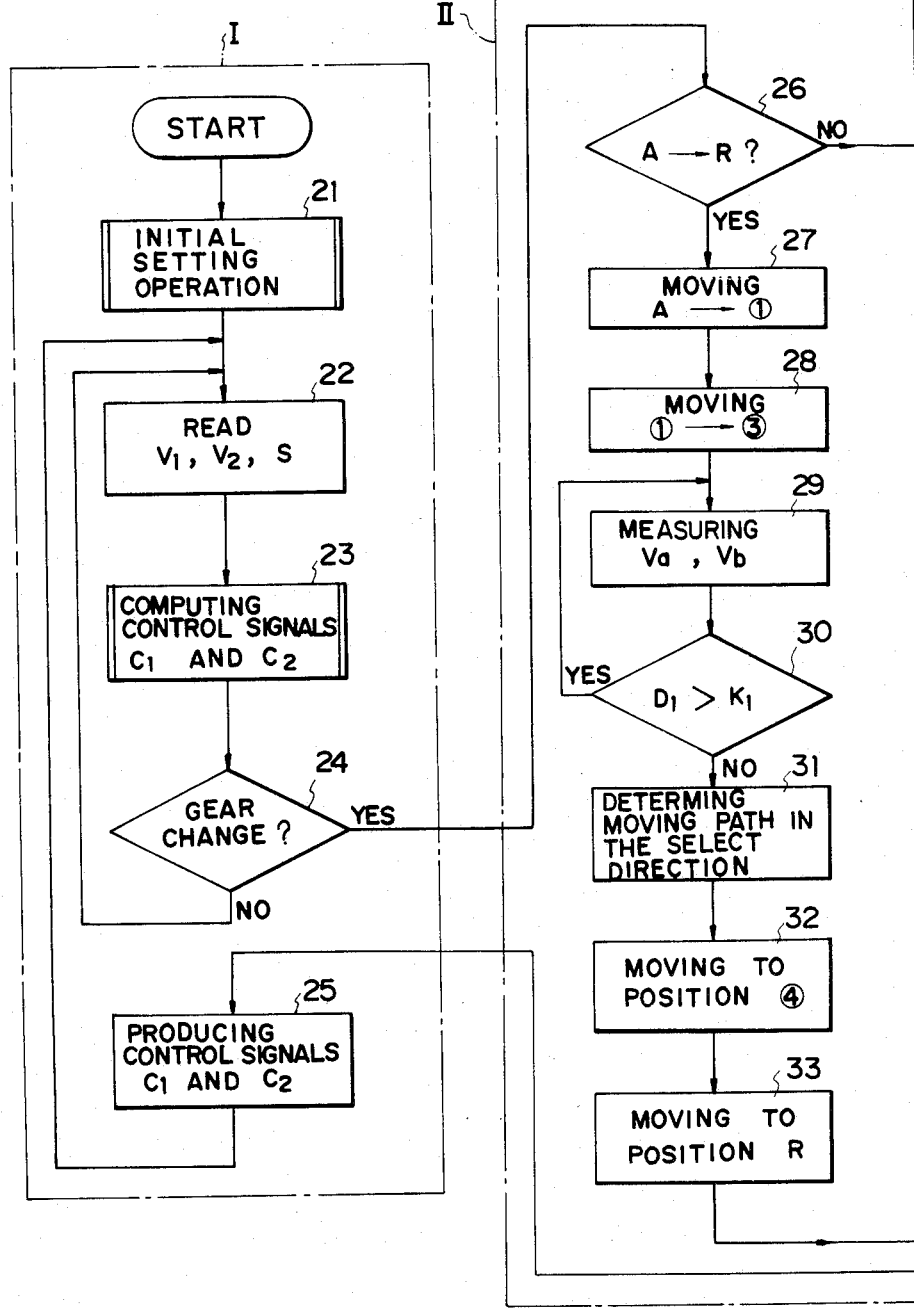

APPARATUS FOR CONTROLLING A SPEED CHANGE GEAR

The present invention relates to an apparatus for controlling a speed change gear, and more particularly to an apparatus responsive to an electric control signal from a control unit for actuating an actuator connected to the change lever of the speed change gear of an internal combustion engine vehicle to position the change lever at a desired position.

In the prior art, for example, U.S. Pat. No. 4,168,638, that has been proposed an automatic speed change gear for use in internal combustion engine vehicles which is so arranged that the change lever of the conventional manually operated type is operated by an actuator driver in accordance with the control signal from a control unit. In this automatic speed change gear, the optimum position of the change lever is computed in the control unit on the basis of the signal or signals representing the operating condition of the internal combustion engine vehicle, and the actuator is actuated in response to the computed result to automatically change the position of the change lever to the optimum position.

Although such a conventional apparatus using a manual type speed change gear has an advantage of high fuel efficiency as compared with the conventional apparatus using a torque converter, since the positioning operation of the change lever has to be carried out with high accuracy, there is the disadvantage of the need for complex adjustment of the control unit to avoid errors in moving and positioning of the change lever. That is, allowable ranges are provided for each setting position of the change lever and the moving path for the change lever so as to allow the change lever to be moved or positioned with some positional error. These allowable ranges are, however, only approximately ±0.3 (mm) at the maximum. Therefore, when a hydraulic actuator or the like is used as the actuator for operating the change lever, it is not easy to operate the change lever within the allowable ranges and the change lever is apt to be made inoperative because of the changes in the correct moving paths or gear shift positions of the speed change gear and/or the actuator through replacement of various parts or due to wear over the passage of time. Especially, the apparatus using a manual type speed change gear requires much time for adjustment during assembly, and for re-adjustment when the position detecting device or the control unit is replaced or repaired.

It is, therefore, an object of the present invention to provide an improved apparatus for controlling a speed change gear having a learning function for determining the correct movements and positions of the gear change lever in the gear shift passages.

It is another object of the present invention to provide an apparatus for controlling a speed change gear which has a learning function by which the displacement of the change lever can be automatically corrected by updating data stored in memory on the actual widths and lengths of the gear shift passages, in order to eliminate the need for manual positional adjustment mentioned above.

According to the present invention, in an apparatus for controlling a speed change gear which has first and second actuators for providing motion in a predetermined plane to a change lever connected with a speed change gear so as to be movable to each gear shift position by passing through a passage with a predetermined width, first and second sensors for producing first and second position signals which indicate the actual position of the change lever, a memory storing data on the movements and positions of the gear shift lever in the gear shift passages, and a control unit responsive to a command signal for producing first and second control signals for controlling the first and second actuators in such a way that the change lever is positioned at a desired position by passing along a moving path determined by referring to the data stored in the memory, the first and second signals being applied to the control circuit as feedback signals, the apparatus comprises a first means for obtaining detection signals corresponding to the opposite side positions of the passage from the first and second sensors by moving the change lever between the opposite sides at any desired portion within the passage, a second means for updating the data stored in the memory on the basis of the detection signals and a third means for computing the optimum moving path for the change lever on the basis of the updated data stored in the memory.

The moving path is determined so as to be located equidistant from the opposite sides of the passage. The computation for determining the moving path may be carried out for every gear change operation or at predetermined time intervals.

Further objects and advantages of the present invention will be apparent from the following detailed description to be read in conjunction with the accompanying drawings in which.

Figure 1:
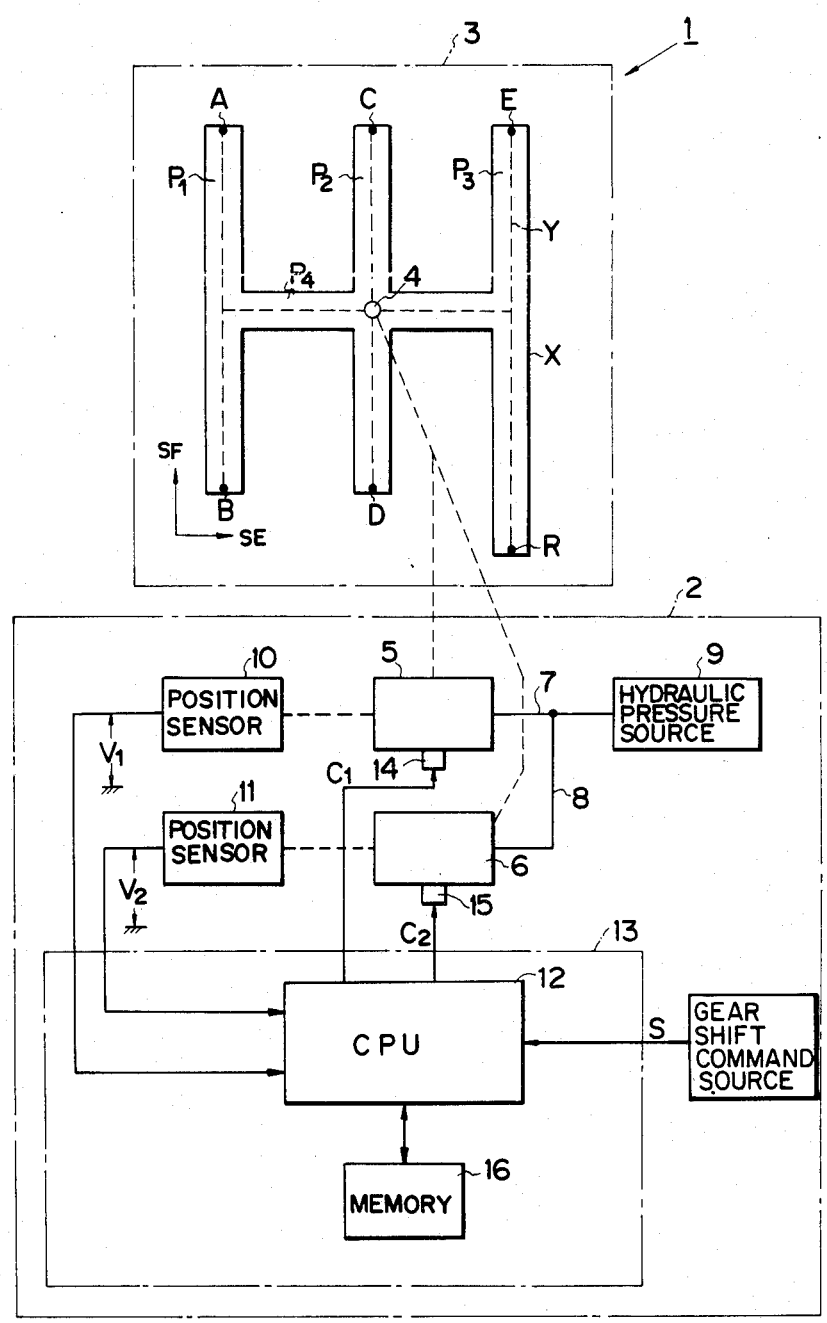
FIG. 1 is a block diagram of an embodiment of an automatic speed change gear system including a controlling apparatus of the present invention.

Referring to FIG. 1, there is shown an automatic speed change gear system 1 including a controlling apparatus 2 according to the present invention. The automatic speed change gear system 1 has a manually operated type speed change gear 3 having a change lever 4 and the controlling apparatus 2 for controlling the position of the change lever 4. The change lever 4 is mechanically allowed to move within passages $P_1$, $P_2$, $P_3$ and $P_4$ having a predetermined width and length, respectively, which are defined by the mechanical structure of the speed change gear 3. The boundaries of these passages are denoted by solid lines X. The gear shift positions A to E and R are set within the area of each passage, and the change lever 4 can be operated so as to be positioned at any desired gear shift position by passing through the respective passages.

To actuate the change lever 4, the controlling apparatus 2 has two hydraulic actuators 5 and 6 which are mechanically connected with the change lever 4 by means of a suitable mechanism, such as a link mechanism. The change lever 4 is movable in the shift direction SF which is parallel to the longitudinal direction of passages $P_1$, $P_2$ and $P_3$ and in select direction SE which is parallel to the longitudinal direction of a passage $P_4$ and is perpendicular to the shift direction SF. As a result, the change lever 4 can be moved within the passages $P_1$ to $P_4$ by means of the hydraulic actuators 5 and 6 to which hydraulic pressure is applied through hydraulic passages 7 and 8 from a hydraulic pressure source 9.

The controlling apparatus 2 has a position sensor 10 connected to the hydraulic actuator 5 to produce a voltage signal $V_1$ showing the position of the change lever 4 in the shift direction SF and another position sensor 11 connected to the hydraulic actuator 6 to produce a voltage signal $V_2$ showing the position of the change lever 4 in the select direction SE. These voltage signals $V_1$ and $V_2$ are applied to a central processing unit (CPU) 12 of a control unit 13 as feedback signals. A command signal S which shows the desired shift position of the change lever 4 is also applied to the CPU 12, and control signals $C_1$ and $C_2$, by which the hydraulic actuators 5 and 6 are driven so as to position the change lever 4 at the position shown by the command signal S, are produced from the CPU 12 in response to the voltage signals $V_1$ and $V_2$ and the command signal S. These control signals $C_1$ and $C_2$ are applied to solenoid valves 14 and 15, respectively, to open/close the solenoid valves 14 and 15 and thereby control the hydraulic pressure supplied from the hydraulic pressure source 9 to the hydraulic actuators 5 and 6. As a result, the position of the change lever 4 can be controlled.

The above-mentioned positioning control operation carried out in response to the voltage signals $V_1$ and $V_2$ and the command signal S is executed in accordance with a control program and various data stored in a memory 16 in advance. That is, the relationshp between the position of the change lever 4 along the shift direction (referred to as "shift position" hereinafter) and the level of the voltage signal $V_1$ and the relationship between the position of the change lever 4 along the select direction (referred to as "select position" hereinafter) and the level of the voltage signal $V_2$ are stored in the memory 16 in advance, and the difference between the actual shift position of the change lever 4 and the target shift position shown by the command signal S and the difference between the actual select position of the change lever 4 and the target select position shown by the command signal S are computed in the CPU 12 on the basis of the relationships stored in the memory 16. Thus, the control signals $C_1$ and $C_2$ are produced on the basis of the computed result mentioned above to move the change lever 4 along the broken line Y which is determined on the basis of the stored data concerning the configuration of the passages $P_1$, $P_2$, $P_3$ and $P_4$. In FIG. 1, the gear shift positions A to E correspond to the first to fifth speed positions, respectively, and the gear shift position R is a reverse gear shift position.

Since the width of the passages $P_1$ to $P_4$ is relatively narrow, when the relationship between the actual position of the change lever 4 and the voltage signals $V_1$ and $V_2$ becomes different from the relationship represented by the data stored in the memory 16 is advance due to change with time, replacement of parts, repair of the speed change gear 3 or the like, the moving path shown by the broken line Y is shifted one way or another, so that the motion of the change lever 4 in the shift direction and/or the select direction may be disturbed.

To eliminate the drawbacks mentioned above and to enable the change lever 4 to always move along the prescribed path located equidistant from the opposite sides of each passage, a learning program, by which the position of the optimum path is automatically determined, is stored in the memory 16.

Figure 2:
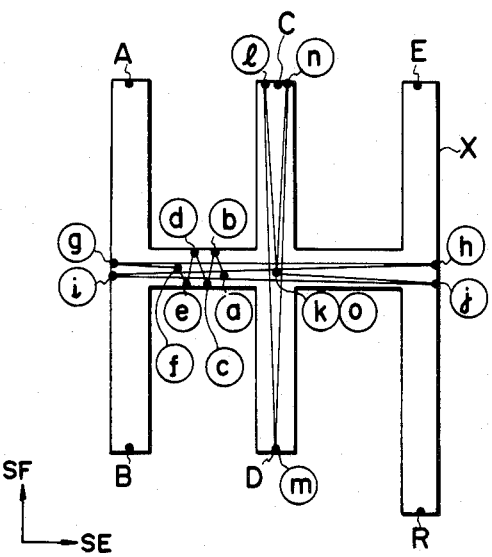
FIG. 2 is a view for illustrating the principle of operation based on the learning program which is stored in a memory of the apparatus shown in FIG. 1.

In FIG. 2, there is shown a view illustrating an example of the basic learning operation based on the learning program mentioned above. The feature of this basic operation is that the voltage signals $V_1$ and $V_2$ corresponding to the opposite side positions of the passage are determined by repeatedly moving the change lever 4 at least in the width direction of the passage in order to measure the configuration and position of the respective passages.

The learning operation based on the learning program will be described. Assuming that the change lever 4 is first positioned at ⓐ, and is then operated to move in the shift direction or the width direction of the passage $P_4$ so as to position it at ⓑ, ⓒ, ⓓ and ⓔ in that order. The positions ⓑ, ⓒ, ⓓ and ⓔ are the side positions of the passage $P_4$, so that the position of the side edges of the passage $P_4$ in the shift direction SF can be known from the values of the voltage signal $V_1$ at the time the change lever 4 is positioned at ⓑ, ⓒ, ⓓ and ⓔ. After this, the position ⓕ which is located equidistant from the opposite side of the passage $P_4$ is calculated. Thus, the change lever 4 is fixed in the shift direction in such a way that the shift position of the change lever 4 is equal to that of the position ⓕ. and the change lever 4 is moved in the select direction SE without changing position in the shift direction. By the moving operation, the change lever 4 is positioned at ⓖ, ⓗ, ⓘ and ⓙ in that order. The positions ⓖ, ⓗ, ⓘ and ⓙ are the side positions of the passage $P_4$ in the longitudinal direction. Therefore, as in the preceding operation, the position of the side edges of the passage $P_4$ in the select direction SE can be known from the values of the voltage signals $V_2$ at the time the change lever 4 is positioned at ⓖ, ⓗ, ⓘ and ⓙ. As a result, it is possible to determine the neutral position ⓚ of the change lever 4 on the basis of the result of the above operation. In FIG. 2, the position ⓖ is spaced from the position ⓘ for the sake of explanation. However, in actual operation, the position ⓖ is coincident with the position ⓘ. For the same reason, the position ⓑ, is not coincident with the position ⓓ and the positions ⓐ, ⓒ and ⓔ are not coincident with each other in FIG. 2.

After this, the change lever 4 is positioned at ⓚ, and then, is moved in the shift direction SF so as to be positioned at ⓛ, ⓜ and ⓝ which are the side positions of the passage $P_2$ in the longitudinal direction. Then, on the basis of the voltage signals corresponding to the positions ⓛ, ⓜ and ⓝ, the center position ⓞ located equidistant from the opposite sides of the passage $P_2$ in the shift direction can be easily determined. The position f must be coincident with the position ⓞ in the shift direction, and it is confirmed whether or not the position ⓕ is substantially coincident with the position ⓞ in the shift direction.

After this, in a similar way to that described above, each of shift positions A, B, C, D, E and R and the positions and widths of the remaining passages are measured to obtain data concerning each gear shift position of the change lever 4 and the data concerning the position and the pattern of the passages, and these data are stored in the memory 16. Thus, after this, the positioning operation of the change lever 4 is carried out in accordance with the data stored in the memory 16.

The learning operation described in this embodiment is applicable for initial data setting representing the desired positions and movements of the gear shift lever in the passages. According to this learning program, since all of the data required for the positioning control of the change lever 4 can be automatically obtained by executing the learning program in the control unit 13, no or only rough adjustment of the apparatus 1 at the time of assembly is required. Consequently, fewer manufacturing processes are required, so that a reduction in manufacturing cost is obtained.

In addition, since approximately 30 seconds is required for the initial setting operation described above, the control unit is not responsive to the command signal S during this period. Consequently, during the period of the initial setting operation, it is desired to light a pilot lamp to inform the operator of the fact that the apparatus is in the initial setting operation.

Figure 3B:
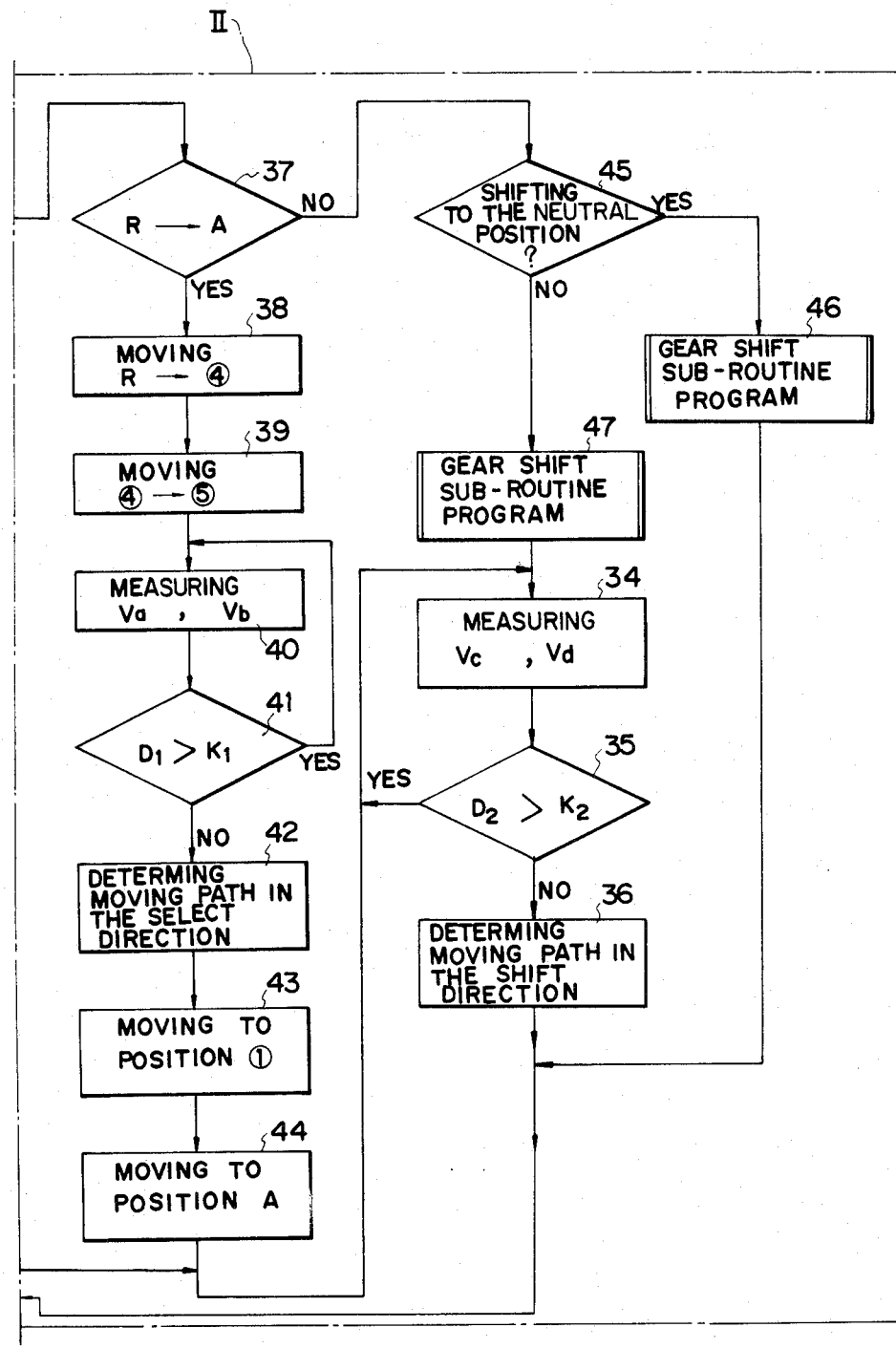
FIG. 3 is a flow chart of the control program stored in the memory of the apparatus shown in FIG. 1.

In FIG. 3, shows the flow chart of a learning program which, after the initial data setting operation is finished, can be suitably used for measuring the shift positions of the change lever 4 (that is, the width in the shift direction at each gear shift position and the center position thereof) about 0.1 second after the termination of each command. The flow chart of FIG. 3 will now be explained with reference to FIG. 3.

In FIG. 3, a main program denoted by a reference numeral, I includes a step 21 for the initial setting operation which has already been described in detail. After the initialization, voltage signals $V_1$ and $V_2$ and the command signal S are read into the CPU 12 (step 22) to compute the control signals $C_1$ and $C_2$ (step 23). After this, it is determined whether or not the gear change operation has been carried out on the basis of the computer result in step 23. When the result in step 24 is "NO", the execution of the main program is returned to the step 22, but when the result therein is "YES", the execution is advanced to a sub-program II which will be described in more detail hereinafter. After the execution of the sub-program II, the control signals $C_1$ and $C_2$ are produced in step 25 of the main program I and the solenoid valves 14 and 15 are actuated in accordance with the control signals $C_1$ and $C_2$. As a result, the change lever 4 is moved to be positioned at the target position shown by the command signals.

Figure 4:
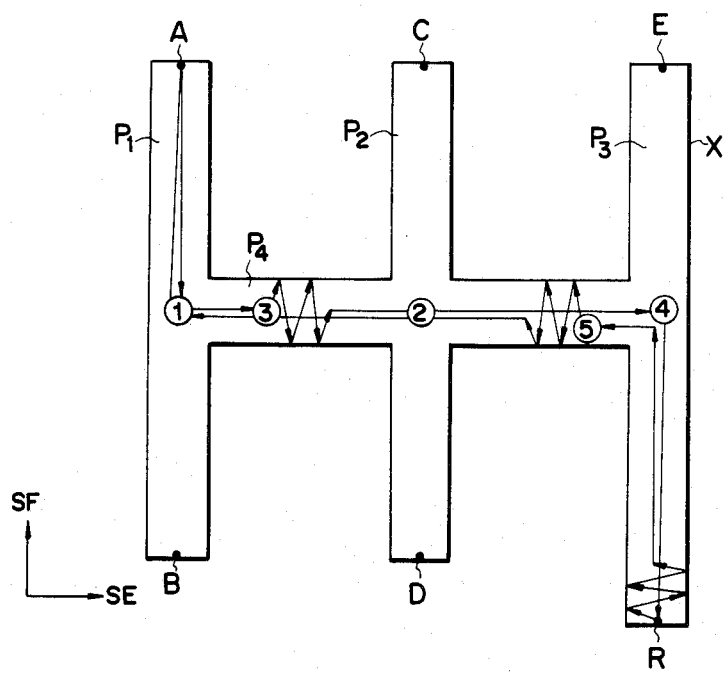
FIG. 4 is a view for illustrating the movement of the change lever which is operated in accordance with the flow chart shown in FIG. 3.

As described above, the sub-program II for measuring each gear shift position by the learning operation is carried out each time the gear shift operation in the speed change gear 3 is carried out under the control of the main program I. In the execution of the sub-program II, it is determined whether or not the gear shift operation is a shifting operation from the first speed position A to the reverse position R (step 26). When the operation is a shift from the position A to the position R, as shown in FIG. 4, the change lever 4 is shifted from the first speed position A to the neutral position ① along the shift direction SF (step 27), and the change lever 4 is further moved from the neutral position ① in the select direction to position the change lever 4 at a position ③ located between the positions ① and ② (step 28). Then, the change lever ④ is moved two round trips in the shift direction SF between the opposite sides of the passage $P_4$ to obtain the voltage values $V_a$ and $V_b$ of the voltage signal $V_1$ corresponding to the positions of the opposite sides of the passage $P_4$ and the resulting values $V_a$ and $V_b$ are stored in the memory 16 (step 29).

As a result, two sets of $V_a$ and $V_b$ values are measured, and compared with each other to confirm whether or not the measurement error $D_1$ between them is more than a predetermined value $K_1$ (step 30). When the error $D_1$ is more than a predetermined value $K_1$, the execution of the program II is returned to the step 29 to repeat the measurement of the values $V_a$ and $V_b$. When the error $D_1$ is not more than $K_1$, the measured result in the step 29 is stored as renewal data concerning the position of the passage $P_4$, and the position of change lever 4 in shift direction is fixed at the central position equidistant from the opposite sides of the passage $P_4$ determined by the data obtained in the step 20 (step 31). Thus, the moving path of the change lever 4 in the select direction SE is determined.

After this, the change lever 4 is moved in the right hand direction along the determined moving path to position it at 4 (step 32), and then, the change lever 4 is moved in the shift direction SF to be positioned at the desired gear shift position R (step 33). Thus, the desired gear shift operation from the first speed position A to the reverse gear position R is finished. As will be seen from the above description, during the gear shift operation, the measurement of the position of the opposite sides of the passage $P_4$ and the determination of the moving path within the passage $P_4$ in the select direction are performed in a relatively short period of time.

After the gear shift operation is completed as described above, in order to measure the opposite side positions of the passage $P_3$ in the select direction, the change lever 4 is moved two rounds trips in the select direction SE between the opposite sides of the passage $P_3$ when the change lever 4 is at the position R. As a result, the voltage values $V_c$ and $V_d$ of the voltage signal $V_2$ corresponding to the positions of the opposite sides of the passage $P_3$ are obtained and the resulting values $V_c$ and $V_d$ are stored in the memory 16 (step 34).

As a result, two sets $V_c$ and $V_d$ values are measured, and compared with each other to confirm whether or not the measurement error $D_2$ between them is more than a predetermined value $K_2$ (step 35). When the difference $D_2$ is more than the value $K_2$, the execution of the program II is returned to the step 34 to repeat the measurement of the values $V_c$ and $V_d$. When the difference $D_2$ is not more than $K_2$, the measured result in the step 34 is stored as renewal data concerning the position of the passage $P_3$, and the position of change lever 4 in the select direction SE is fixed at the central position equidistant from the opposite sides of the passage $P_3$ determined by the data obtained in the step 34 (step 36). By the steps 34 to 36, the moving path of the change lever 4 in the shift direction of the passage $P_3$ is determined. after this, the execution is returned to the main program I.

In the sub-program II, the learning operation for obtaining the data concerning the position of the passages $P_3$ and $P_4$ is carried out when the gear shift operation from the position R to the position A is carried out. That is, when the result in the step 26 is "NO", it is determined in step 37 whether or not the gear shift operation is an operation for shifting the change lever 4 from the position R to the first speed position A. If the result in the step 37 is "YES", the change lever 4 is moved from the position R in the shift direction SF to be positioned at ④ (step 38). Then, the change lever 4 is moved in the select direction SE to position it at ⑤ (step 39). Then steps 40 and 41 corresponding to the steps 29 and 30, respectively, are executed to store renewal data concerning the position of the passage $P_4$, and the position of the change lever 4 in the shift direction is fixed at the central position equidistant from the opposite sides of the passage $P_4$ determined by the data obtained in the step 40 (step 42). Thus, the moving path of the change lever 4 in the select direction SE is determined.

After this, the change lever 4 is moved in the left hand direction along the determined moving path to position it at ①  (step 43), and then, the change lever 4 is moved in the shift direction SF to be positioned at the desired gear shift position A (step 44). Thus, the desired gear shift operation from the position R to the first speed position A is finished. After this, the steps 34 to 36 are executed, and then, the execution of the program returns to the main program I.

When the result in the step 37 is "NO", it is determined in step 45 whether or not the change lever 4 is to be shifted from a shift position to the neutral position Ⓚ. If the result in step 45 is "YES", the gear shift sub-routine program 46 is executed and the desired gear shift operation is performed. Then, the execution returns to the main program I.

When the result in the step 45 is "NO", after a gear shift sub-routine program 47 is executed, the steps 34 to 36 are executed and then the execution of this program is returned to the main program I.

As described above, during the gear shift operation, a relatively short period of time is provided for measuring the position of the passage for the change lever 4, that is, the allowable width for passing the change lever 4, and the change lever 4 is moved on the basis of up-to-date data concerning the positions of the passages. Consequently, without lowering the positioning speed, the positioning operation of the change lever 4 can always be surely carried out. Erroneous data concerning the positions of the passages which occur with the passage of time are always corrected, so that the time between part replacements can be extended. Consequently, the manufacturing cost will be descreased because less adjustment work is required in the manufacturing process.

In the embodiment described above, although one example of a learning operation for measuring the allowable width of the passage is described, it is also possible to measure the allowable width at each gear shift position just after the gear shift operation has been finished, e.g. at the first speed position A, the second speed position B, . . . , after the clutch engaging operation or at the same time as the clutch engaging operation.

According to the present invention, the optimum moving path of the change lever can be automatically determined by the learning function, and it is therefore possible to move the change lever smoothly to the desired gear shift position. As a result, no adjustment of the voltage signals from the position sensors, is required even when the apparatus 1 has been replaced or repaired, so that maintenance, inspection and the like can be remarkably simplified.

We claim:

1. In an apparatus for automatically controlling a gear shift operation having first and second actuators for moving a gear lever connected with a speed change gear in first and second directions through gear shift passages to desired gear shift positions, said passages having defined widths and lengths for the movement of said gear lever, a memory for storing data on desired gear shift positions in said passages, first and second sensors for producing first and second position signals which indicate the actual position in said first and second directions of the gear lever in said passages, and computer means for receiving said first and second position signals, said data on desired gear shift positions, and an input gear shift command signal indicating a desired gear shift position to which the gear lever is to be moved, and for providing movement control signals to said first and second actuators for moving said gear lever to the desired gear shift position, the improvement comprising said computer means having an updating program for storing updated data in said memory on said desired gear shift positions in said passages to allow optimum movement of said gear lever in said passages based upon said updated data, said updating program including a first part for providing control signals for moving said gear lever across the lengths or widths of said passages and obtaining position signals from said sensors indicative of the length or width positions of the passages, and a second part for updating the data stored in said memory on the basis of said obtained position signals.

2. An apparatus as claimed in claim 1 wherein the relationship between the position of said gear lever and the first and second position signals is stored in said memory.

3. An apparatus as claimed in claim 1 wherein said first part controls the movement of said gear lever to obtain information concerning the passage and all of the gear shift positions of said gear lever.

4. An apparatus as claimed in claim 3 wherein said first program part starts to operate in response to the fact that said apparatus is turned ON.

5. An apparatus as claimed in claim 1 further comprises means which renders said first program part operative after the termination of each gear shift operation based on said command signal, whereby the data concerning the width of said passage at the gear shift position is updated.

6. An apparatus as claimed in claim 1 wherein said gear lever is movable in two different directions perpendicular to each other.

7. The apparatus of claim 1, wherein said computer means performs an updating operation for all gear shift positions when the apparatus is initially turned on, and subsequently performs an updating operation after each gear shift operation is completed.

8. The apparatus of claim 1 wherein said stored data includes the positions of each side of the widths of the passages, and the program includes a third part for computing an optimum moving path in a passage to a desired gear shift position equidistant between the positions of the sides of said passages.

* * * * *